(12) United States Patent
Winter et al.

(10) Patent No.: US 10,958,128 B2
(45) Date of Patent: Mar. 23, 2021

(54) FLYWHEEL UNIT WITH DAMPING DEVICE

(71) Applicant: Enrichment Technology Company Ltd. Zweigniederlassung Deutschland, Jülich (DE)

(72) Inventors: Michael Winter, Aachen (DE); Jens Landmesser, Erkelenz (DE)

(73) Assignee: ENRICHMENT TECHNOLOGY COMPANY LTD., Zweigniederlassung (DE)

(*) Notice: Subject to any disclaimer, the term of this patent is extended or adjusted under 35 U.S.C. 154(b) by 548 days.

(21) Appl. No.: 15/765,533

(22) PCT Filed: Oct. 4, 2016

(86) PCT No.: PCT/EP2016/073637
§ 371 (c)(1),
(2) Date: Apr. 3, 2018

(87) PCT Pub. No.: WO2017/060219
PCT Pub. Date: Apr. 13, 2017

(65) Prior Publication Data
US 2018/0287456 A1    Oct. 4, 2018

(30) Foreign Application Priority Data

Oct. 5, 2015   (EP) .................... 15188365

(51) Int. Cl.
*H02K 5/24*    (2006.01)
*H02K 7/02*    (2006.01)
(Continued)

(52) U.S. Cl.
CPC ................. *H02K 5/24* (2013.01); *H02K 5/04* (2013.01); *H02K 5/22* (2013.01); *H02K 7/025* (2013.01); *Y02E 60/16* (2013.01)

(58) Field of Classification Search
CPC .. H02K 5/24; H02K 5/22; H02K 7/02; H02K 7/025; H02K 7/09; H02K 7/00;
(Continued)

(56) References Cited

U.S. PATENT DOCUMENTS 7,679,245 B2 * 3/2010 Brackett ............... F16C 39/063
                                                      310/90.5
10,508,710 B2 * 12/2019 Veltri .................... F16F 15/302

FOREIGN PATENT DOCUMENTS

DE        356356 C      7/1922
DE       19608099 C1    2/1997
DE       19709674 C1    2/1998

OTHER PUBLICATIONS

English Translation of International Preliminary Report on Patentability for corresponding International Application No. PCT/EP2016/073637.

(Continued)

*Primary Examiner* — Tran N Nguyen
*Assistant Examiner* — Leda T Pham
(74) *Attorney, Agent, or Firm* — Tarolli, Sundheim, Covell & Tummino LLP

(57) ABSTRACT

The invention relates to a flywheel unit with a damping device for fastening the flywheel unit and a flywheel energy store. The flywheel unit comprises a rotor, a machine housing enclosing the rotor and with an underside, and a damping device fastened to the underside of the machine housing for fastening the flywheel unit to a suitable foundation, wherein the damping device comprises a lower stand unit for fastening to the foundation, an upper stand unit for fastening to the underside of the machine housing, and a membrane connecting the lower stand unit with the upper stand unit, wherein the upper and lower stand units as well as the membrane are configured in such away, that the (Continued)

membrane can establish a pliable self-supporting connection between the upper and lower stand units.

15 Claims, 3 Drawing Sheets

(51) Int. Cl.
*H02K 5/04* (2006.01)
*H02K 5/22* (2006.01)

(58) Field of Classification Search
CPC .. H02K 9/19; H02K 5/10; F16C 39/06; F16C 39/00; F16F 15/30; F16F 15/31; F16F 15/315
See application file for complete search history.

(56) References Cited

OTHER PUBLICATIONS

Post R F et al.: "Flywheels", Scientific American, Scientific American Inc., New York, NY, US. vol. 229, No. 6, Dec. 1, 1973.
International Search Report for corresponding International Application No. PCT/EP2016/073637, dated Nov. 29, 2016.
International Preliminary Report on Patentability for corresponding International Application No. PCT/EP2016/073637, dated Apr. 13, 2017.

\* cited by examiner

FLYWHEEL UNIT WITH DAMPING DEVICE

RELATED APPLICATIONS

The present invention is a U.S. National Stage under 35 USC 371 patent application, claiming priority to Serial No. PCT/EP2016/073637, filed on 4 Oct. 2016; which claims priority of EP 15188365.9, filed on 5 Oct. 2015, the entirety of both of which are incorporated herein by reference.

FIELD OF THE INVENTION

The invention relates to a flywheel unit with a damping device for fastening the flywheel unit in a flywheel energy store and to a flywheel energy store having such flywheel units.

BACKGROUND OF THE INVENTION

Nowadays, regenerative energy sources are increasingly installed, precisely due to the better environmental compatibility compared to conventional energy-generating devices. As these regenerative energy sources usually do not supply their energy continuously, there is a high demand for energy stores. Flywheels are used to store energy in the form of rotational energy. Via suitable decoupling means, electrical energy can be stored in these energy stores in the form of rotational energy and, if required, can be re-converted back into electrical energy and output to a consumer. Such flywheel energy stores must have a high storage capacity, which is why they are equipped with a plurality of flywheel units arranged next to one another, the storing capacity of which add-up to a total energy store capacity. Flywheel units mostly have a hollow cylinder as a rotor, which, according to its rotational speed and mass, stores a certain amount of energy. In order to provide a as high as possible storage capacity of such a flywheel unit, the rotors are operated at a rotational speed of up to 50,000 rpm and more. The rotors are operated in encapsulated housings (machine housings of the flywheel unit) in order to protect the surroundings from rotor falls.

In the case of a fall of a rotor rotating at such a high rotational speed, a so-called crash, very high forces occur to the anchoring of the machine housing in the flywheel energy store, due to the interaction between rotor and machine housing, for a short period of time. In the case that the machine housing is anchored very firmly in the base of the flywheel energy store, e.g. in the concrete foundation thereof, the vibrations of the machine housing caused by the fall are transmitted to neighboring flywheel units, which are disturbed thereby, and may possibly also experience a fall. Such a chain reaction can result in the destruction of the entire flywheel energy store, which is to be avoided.

By means of commercially-available spring damping devices, vibrations or oscillations of the machine housing can be damped in the case of a fall. Due to the high loads occurring at these rotational speeds, these damping elements would have to be configured to be very large in order to sufficiently reduce the fall moment. For machine-related reasons, the flywheel energy stores, have, by contrast, a compact design, on the one hand to allow effective operation of the individual energy store, and, on the other hand, in order that a modular-type plant of a plurality of flywheel energy stores only has a small space requirement. Due to the limited construction space inside the flywheel energy store below the machine housing, the commercially-available spring damping means suitable therefor are not sufficient for absorbing the forces in the case of a fall and to sufficiently damp them, so that these forces can be prevented from being transmitted to neighboring flywheel units. In particular, the high torsional loads in the fall lead to a failure of the available vibration damping means. Basically, however, a destruction or damaging of the foundation is to be prevented in the case of the fall of a single rotor.

It would therefore be desirable to have a damping device available, by means of which the forces, in a falling of a high-speed rotor (rotating with high rotational speed) in a flywheel energy store, can be damped in such a way that a damaging of the neighboring flywheel units can be ruled out.

SUMMARY OF THE INVENTION

It is an object of the present invention to provide a flywheel unit, which is configured in such a way that the released forces in the fall of a high-speed rotor in a flywheel energy store can be received in such a way, that a damaging of the neighboring flywheel units in a compact flywheel energy store with multiple flywheel units can be ruled out.

This object is achieved by a flywheel unit for a flywheel energy store comprising a rotor, a machine housing enclosing the rotor with an underside and a damping device fastened to the underside of the machine housing for fastening the flywheel unit on a suitable foundation, wherein the damping device comprises a lower stand unit for fastening to the foundation, an upper stand unit for fastening to the underside of the machine housing, and a membrane connecting between the lower stand unit with the upper stand unit, wherein the upper and the lower stand unit, as well as the membrane are configured in such a way that the membrane can establish a self-supporting, pliable connection between the upper and the lower stand unit.

In the flywheel unit according to the invention, the forces released in the case of a falling of a high-speed rotor are received in such a way, via the membrane located below the machine housing and fastened to it, that a damaging of the neighboring flywheel units in a compact flywheel energy store having multiple flywheel units can be ruled out. In this case, the anchoring implemented by means of the membrane over the self-supporting connection between machine housing and foundation of the upper and lower stand units is configured to be axial and pliable, wherein the rotational axis in this anchoring is still guided in a rigid manner, due to the limitation of the movability of the membrane in the direction of the rotational axis being established on the lower stand unit. The terms "upper stand unit" and "lower stand unit" refer to the arrangement of the respective stand units closer to the underside of the machine housing (upper stand unit), or further apart from the underside than the upper stand unit (=lower stand unit). Herein referred to as pliable are a system or a connection having a first natural bending frequency smaller than 25 Hz, a first natural axial frequency smaller than 100 Hz and a first natural torsional frequency smaller than 300 Hz. The basic measuring methods for determining the above frequency are known to a person of ordinary skill in the art. These properties are, on the one hand, influenced by the material of the membrane and, on the other hand, by the thickness thereof, as well as the mass of the overall system or the connection. In this case, the membrane of unchanged material becomes more and more rigid the thicker it is produced. With constant thickness, the membrane becomes more and more flexible (pliable) the softer the material of the membrane. The membrane enables that the machine, in particular the machine housing, can move in the direction of the rotational axis and can tumble therearound, wherein a dissipation of the fall moment via the damping device is achieved by means of the fixed clamping of the rotational axis. Such a damping effect with a favorable combination of soft linkage in one direction and rigid linkage in the other direction can not, or only at the expense of large construction space, be implemented using conventional damping components, which would impede a compact design of a flywheel energy store. In addition, with conventional damping components, the high torsional loads in the case of a fall would lead to a failure of the vibration damping devices. The advantages of the flywheel unit having the damping device according to the invention lie in its small requirement in terms of construction space, the simple and cost-effective set-up of the damping device, the simple assembly and the good accessibility of all machine ports after assembly.

Here, the damping device is configured in such a way that it can bear the weight of the machine housing and the rotor. To that end, the upper and the lower stand unit are formed of metal, in particular steel, for example, and with a wall thickness adapted to the weight of the machine housing and of the rotor. The lower stand unit can be configured as a cylinder-shaped ring with recesses and elevations arranged therebetween in the direction of the membrane. The elevations then form a bearing surface for the membrane. As an alternative thereto, a plurality of bases could be arranged in a geometrical arrangement, e.g. in the shape of a ring on an underlay, next to one another, as the lower stand unit, wherein the upper sides of which form a common bearing surface for the membrane, wherein the bearing surface is interrupted between the bases. This geometrical arrangement can alternatively also be configured as to have a different geometry one with respect to the other.

The membrane refers to a disc that is thin when viewed relative to the height of the upper and the lower stand units, and made of a material which, due to deformation, allows for a tumbling movement of the machine housing around the rotational axis of the rotor. Suitable membranes are, for example, steel sheets having a thickness adapted to the weight and the torsional forces which occur in the case of a fall, e.g. 15 mm for rotors having an axial moment of inertia of 1.2 kg/m$^2$, a housing mass of 785 kg and a rotational speed of 750 Hz. For these purposes, steel has a high stress tolerance with sufficient flexibility in order to provide a pliability. The deformation of the membrane leads to an at least partial decoupling of the movement of the machine housing from the foundation. Preferably, the material of the membrane possesses a rigidity greater than 250 MPa to that end. Suitable materials for a membrane would e.g. be metals (for example, steel) or so-called CFK composite materials. In this case, the membrane is fixedly clamped to the bearing surface of the lower stand unit. To that end, the membrane can be fastened to the bearing surface by means of screw connections and/or by means of a mounting or clamping ring, for example. The self-supporting connection herein refers to the region of the membrane which is not supported from below (from the side of the membrane facing away from the machine housing) by the lower stand unit relative to the weight of the machine housing. Fastening of the machine housing onto the membrane is effected indirectly by means of the upper stand unit arranged between the machine housing and the membrane. The upper stand unit can in this case be configured like the lower stand unit, e.g. likewise as a cylinder-shaped ring with recesses and elevations arranged therebetween in the direction of the membrane. The elevations then form a bearing surface of the upper stand unit on the membrane. As an alternative thereto, a plurality of machine bases could be arranged with respect to one another in a geometrical arrangement, such as in annular shape on an underlay as the upper stand unit, wherein the undersides of which form a common bearing surface on the membrane, wherein the bearing surface is interrupted between the bases. This geometrical arrangement can alternatively also be configured as to have a different geometry with respect to one another.

In one embodiment, the membrane comprises a membrane package of a plurality of material layers arranged one on top of the other. In one embodiment, the material layers are only fixedly connected to one another on mounting points. In other embodiments, the material layers can also be connected to one another differently or be in direct or indirect contact with one another. Preferably, the membrane is formed completely of such a membrane package. In a moving machine housing, the neighboring material layers are in mutual friction one with the other, and therefore absorb more energy or respectively damp a movement of the machine housing even more effectively than a membrane of a compact, integral material. In a preferred embodiment, the membrane package comprises material layers which damp and support and are at least in part arranged alternately. Metal layers (such as steel layers or steel plates) can, e.g., be used as supporting material layers and layers of CFK composite material can be used as damping material layers.

Here and in the following, the term "rotor" refers to entirety of parts which are induced to rotate. The rotors can be of different shapes. In the present invention, the rotor has a rotating body with cylindrical shape (cylinder). The rotating body is the component which primarily stores the energy in form of kinetic energy. The remaining components connect the rotating body with a drive or with a mount for the rotor, in order to allow for the latter to rotate as loss-free as possible. The rotor can, e.g., be a cylinder open or closed on both sides (ends), which is connected via at least two hubs to respective bearings (a first bearing for the first hub and a second bearing for the second hub). Here, this connection is not established directly by the hubs, but by a pin which is fastened in the respective hub. In another embodiment, the rotor can comprise a continuous duct, having the hubs arranged thereon. The ends of the duct are referred to as pins here. Depending on the arrangement within the cylinder, the hubs can at least partially close the latter towards the ends thereof. Here, the hubs can be arranged within the rotating body with the same orientation or alignment. The hubs can be arranged in the rotating body at any arbitrary, suitable position. Here, the hubs can be connected inside the rotational body with said rotational body. In one embodiment, the hubs are arranged within the rotational body in the area of the open ends. The term "in the area" refers to the area of the rotational body which extends from the open end alongside the rotational body up to the position in which a hub with pinion protrudes with the pinion straight beyond the open end of the rotational body. Here, connection with the rotational body can be formed by compressing/pressing or bonding or another suitable technique. The rotational body and/or the hubs can here be made of carbon fiber-reinforced plastic (CFK laminate).

For providing the highest possible storage capacity of this flywheel unit, the rotors are operated with rotational speeds of up to 5,000 rpm or higher. In order to allow for the rotor to rotate with as small losses as possible, the rotor is operated in a vacuum. To that end, the rotor has to be encapsulated in a manner to be vacuum-sealed by means of the machine housing. At the same time, the machine housing serves to protect the environment against rotor falls, and therefore is usually made of metal, in particular steel, adapted to the forces expected to be released in the case of a fall in terms of its thickness, e.g. 25 mm for rotors having an axial mass inertia moment of 1.2 kg/m$^2$, a housing mass of 785 kg and a rotational speed of 750 Hz. Preferably, the shape of the machine housing is adapted to the shape of the rotor here. For example, the machine housing has a cylindrical shape with a lid and a bottom part, which, in this invention, is referred to as underside. Herein, the underside refers to the side which, in the case of a rotational axis arranged perpendicular to the ground, is facing the ground. Accordingly, the lid is facing the opposite side, e.g. the roof of a flywheel energy store.

In one embodiment, the lower stand unit comprises at least three bottom bases separated relative to one another with a first bottom base height, on which the membrane is clamped, wherein the bottom bases are arranged relative to the one other in such a way that the projecting of the center point of the underside along the rotational axis of the rotor is located within a supporting surface spanned by the two bottom bases. Here, the bearing surfaces of the bottom bases define the corner points of the supporting surface. As the machine housing usually encloses the rotor symmetrically, the center of gravity of the machine housing with rotor is usually located on the rotational axis above the center point, or only slightly deviates therefrom in its lateral position perpendicular to the rotational axis. In this arrangement, the membrane spanned on the bottom bases provides a stable support for the machine housing mounted thereon, which support is sufficiently supported against lateral tilting by means of the bottom bases. The use of bottom bases enables a damping device that is simple and quick to mount below the machine housing. With three or more bottom bases, the damping device is furthermore sufficiently stable to compensate for falling loads. In another embodiment, the separate bottom bases of the lower stand unit are in this case arranged symmetrically to one another, around the rotational axis of the rotor, in a plane parallel to the base area.

In a preferred embodiment, the lower stand unit comprises at most six separate bottom bases. Owing to this maximum number of bottom bases, a sufficiently-large self-supporting connection established by the membrane is provided between the bottom bases, the flexibility and pliability of which is sufficient to absorb and damp the falling loads. Owing to the number and arrangement of the bottom bases, the rigidity ratios (degree of pliability) of the self-supporting connection of the membrane can be influenced as desired.

In another embodiment, the upper stand unit comprises a number of machine bases having a machine base height, which bases are connected to the membrane between the membrane and the base area of the machine housing on the self-supporting regions of the membrane at respective machine base positions. By means of the machine bases, the underside of the machine housing is not directly, but rather indirectly connected to the membrane via the machine bases. This ensures that the machine housing is exclusively fastened on self-supporting connections of the membrane between the bottom bases. Therefore, the falling loads cane be particularly well absorbed and damped.

In a preferred embodiment, the machine base positions are each located in the membrane segment spanned between two neighboring bottom bases and the rotational axis of the rotor. This makes use of the damping effect of the pliable membrane in a particularly good manner. In a preferred embodiment, the number of machine bases equals the number of bottom bases, and the machine base positions in the membrane plane each have the same distance to the respective neighboring bottom bases. Therefore, the machine bases are located in the middle between the bottom bases, such that the pliable connection from the machine base to the neighboring bottom bases is the longest. This maximizes the damping effect of the pliable membrane for the respective membrane used.

In another embodiment, the lower stand unit additionally comprises one or multiple damping elements, which are arranged below the machine base positions, and which support the membrane against the foundation in a resilient manner. This allows for the damping unit to be used for other flywheel units with other weights with identical damping properties. The dampening effect of the damping elements can be adjusted as desired by means of appropriate material selection for the damping elements. The damping elements can e.g. be configured as rubber buffers having a height equal to the height of the bottom bases. Additionally, membranes can be used, the material of which has a stability insufficient for the weight of the housing with rotor, as the damping elements additionally support the membrane between the bottom bases.

In another embodiment, the membrane comprises a middle opening, and a continuous surface extending circumferentially around the opening and fastened on the bottom bases. The continuous surface establishes a self-supporting connection between two neighboring bottom bases which have a bearing surface sufficiently large to position the machine housing or the machine bases thereon. The size and shape of the supporting surface is not changed by the central opening, as the area of the opening, even in the closed state, does not, or only marginally contribute to the support, but rather only the outer regions, in which the machine housing or the machine bases rest. The self-supporting connections are nevertheless more flexible in with an opening being present, and can more easily be deformed by the falling loads, which leads to a more effective absorption of energy and damping in the case of a fall. Owing to the shape of the circumferential, continuous surface, the rigidity ratios of the self-supporting connection of the membrane can be influenced as desired.

In one embodiment, the shape of the membrane is adapted to the shape of the underside in such a way that the membrane does not project beyond the underside perpendicular to the rotational axis. With a corresponding arrangement of the lower and the upper stand units, the load of the machine housing is therefore dissipated vertically downwards to the foundation. By means of these arrangements, damping devices can be provided, with which the required construction space, perpendicular to the axis of rotation, to be configured in a minimal manner, for implementing the damping device. With such a damping device, particularly compact flywheel energy stores can be provided, with a plurality of flywheel units with smallest possible bottom area of the flywheel energy store, with still particularly good damping properties. In a preferred embodiment of the invention, the underside comprises a circumferential edge surface and a bottom surface located within said edge surface, wherein the shape of the membrane as a projection of the edge surface in parallel to the rotational axis has the same shape as the edge surface. Therefore, even less construction space is required for the damping device in radial direction to the rotational axis of the rotor. In this case, the edge surface and the membrane can accordingly be ring-shaped. This prevents a so-called clicker effect of the membrane.

In one embodiment, the edge surface is formed as a flange fastened to the membrane via the upper stand element. This allows for fast and simple connection of the machine housing with the membrane.

In one embodiment, the flywheel unit comprises a mounting plate, on which the lower stand unit is fastened for subsequent connection with the foundation. This allows for the flywheel unit to be fastened onto the bottom of the flywheel energy store or the foundation, respectively.

The invention further relates to a flywheel energy store comprising a multitude of flywheel units according to the invention, wherein the flywheel units are fixedly connected to a foundation of the flywheel energy store, e.g. directly via the lower stand element, or indirectly via a mounting plate, on which the lower stand element is fastened. In this case, the flywheel units preferably have rotors with respective rotational axes perpendicular to the bottom of the flywheel energy store. For example, the flywheel energy store can additionally comprise a vacuum module for generating a minimum vacuum in the respective flywheel units required for operation of the flywheel units, one or more grid-connecting points and a modular control system, which is configured for a suitable control, at least of the flywheel units and the vacuum module and for a data communication via a data interface for executing external control commands, wherein the one or multiple network interfaces are at least provided for connection to a local (company grid, area grid and city grid) and/or a non-local power grid (transmission or distributing network, such as the public power grid). The flywheel energy store can in this case comprise a module housing, which is configured to be suitable to ensure for secure transportation of the components located therein, and to absorb static or dynamic loads of the flywheel units in operation. For a robust module housing, the latter can be made. e.g. at least with a vast majority, out of concrete, metal or steel, it preferably is completely produced from steel.

In one embodiment, the distance of neighboring flywheel units perpendicular to the rotational axes in the flywheel energy store is smaller than or equal to 50 mm.

In one embodiment, the flywheel energy store comprises a cooling and/or heating module for removing at least internal thermal loads during operation of the flywheel units or for air-conditioning during operation of the flywheel units, preferably also for maintaining a minimum temperature. The cooling module, in this case, refers to a device for cooling of facilities, so that e.g. the internal thermal loads, the electric losses, the frictional heat during operation of the flywheel units and the waste heat of the modules, such as of the vacuum module, can be dissipated. A too-high internal temperature of the module housing leads to a higher risk of failure of the electronics located therein, in particular of the power electronics. Typically, maximum temperatures of 45° C. are allowed inside the module housing. A heating module, in contrast, ensures that inside the module housing, maximum negative temperatures do not drop below 10° C., in order to prevent the formation of condensation water. In this case, external temperature ranges of −20° C. to 50° C. are usual, and in an extreme case, maximum lowest temperatures of −30° C. and maximum highest temperatures of 60° C. are to be tolerated. As far as losses allow for it, passive heating/cooling devices such as plate heat exchangers on the ceiling of the module housing are to be preferred as heating and cooling module, which passively allow for a coolant circulation and heat exchange by means of convection, as they less negatively impact on the overall effectiveness of the facility.

BRIEF DESCRIPTION OF THE DRAWINGS

These and other aspects of the invention are shown in detail in the drawings as follows.

DETAILED DESCRIPTION OF THE EXEMPLARY EMBODIMENTS

Figure 1:
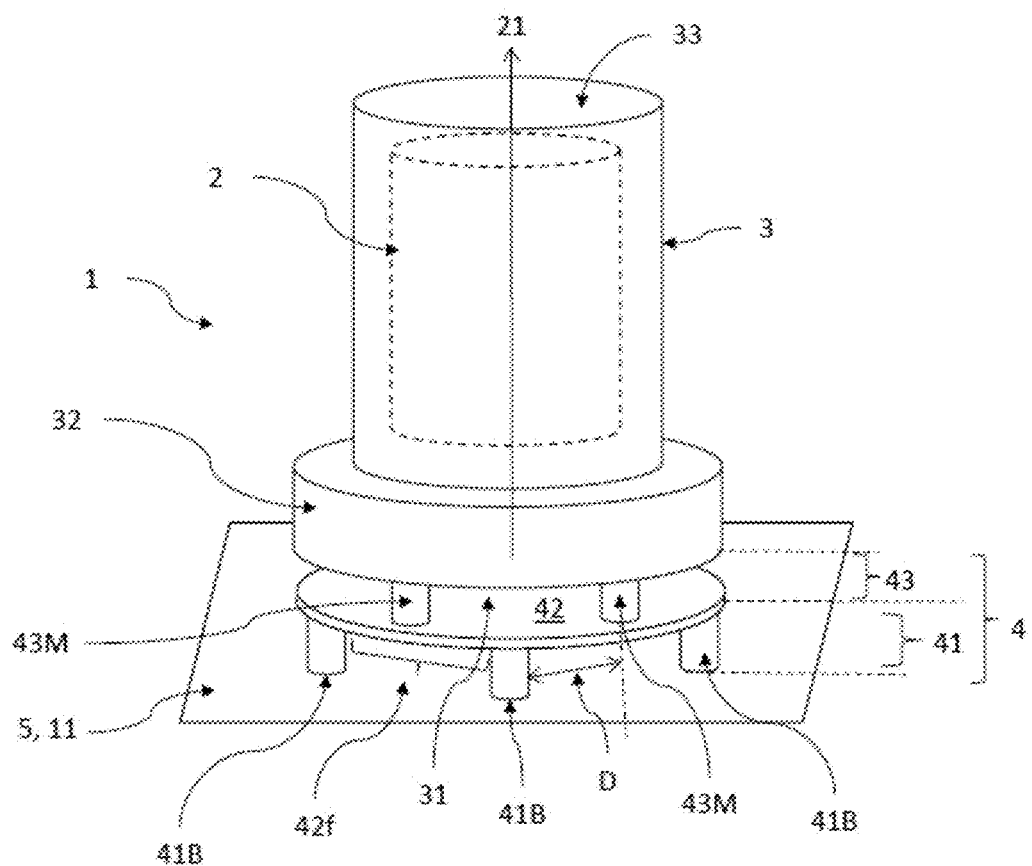
FIG. 1: shows an exemplary embodiment of a flywheel unit according to the invention with a damping device in a perspective side view.

FIG. 1 shows an exemplary embodiment of a flywheel unit 1 according to the invention with a damping device 4 in a perspective side view. In this case, a flywheel unit 1 with a rotor 2 indicated by dashed lines is shown, which rotor is enclosed by a machine housing 3 for protection of the surroundings relative to the rotor. The machine housing 3 comprises an underside 31, to which a damping device 4 for fastening the flywheel unit 1 onto a foundation 11 or a mounting plate 5 is fastened. The damping device 4 comprises a lower stand unit 41 circumferentially below the underside 31, which, in this exemplary embodiment, is formed by four separate bottom bases 41B with a first bottom base height BH, wherein the bottom bases 41B are arranged, in a plane in parallel to the underside 31, symmetrically to one another, around the rotational axis 21 of the rotor 2, in a square. In this perspective view, the rear bottom base is obscured by the other components of the damping device 4. In this case, the lower stand unit 41 is hollow between the bottom bases 41B below the underside 31. In this embodiment, the underside 31 of the machine housing 3 is indirectly fastened on the membrane 42 by means of the upper stand element 43, which comprises a number of machine bases 43 having a machine base height MH, which bases are connected to the membrane 42 between the membrane 42 and the base area 31 of the machine housing 3 on the self-supporting regions 42*f* of the membrane 42 on respective machine base positions. In this case, the number (four) of machine bases 43 is equal to the number (four) of bottom bases 412. Due to the perspective view, two machine bases 43 are obscured by the underside 31 of the machine housing 3, the machine base positions are in this case each arranged in the self-supporting membrane segment spanned between the two neighboring bottom bases 412 and the rotational axis 21 of the rotor 2, wherein the machine base positions in the plane of the membrane in each case have the same distance D to the respective neighboring bottom bases 412. In another embodiment, it is also possible that merely three bottom bases 41B and three machine bases 43M could be used, which are arranged symmetrically to one another, in the form of an isosceles triangle, in order to span a supporting surface SF.

Figure 2:
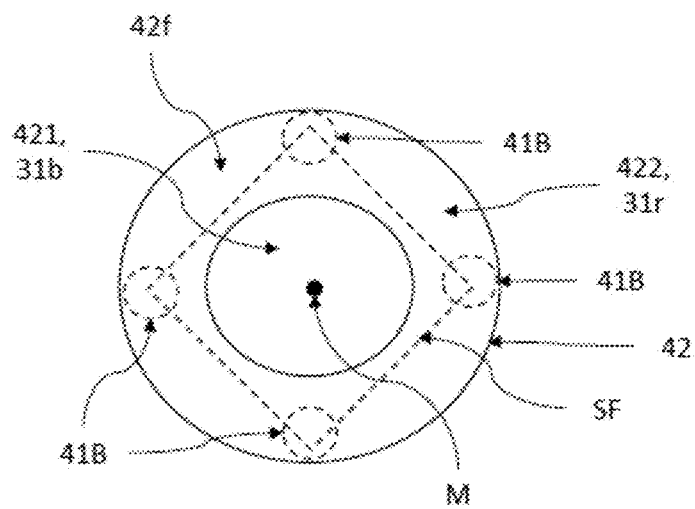
FIG. 2: shows an exemplary embodiment of a damping device according to the invention in a top view of the membrane for a better overview without upper stand element.

FIG. 2 shows an exemplary embodiment of the damping device 4 according to the invention in a top view onto the membrane 42 for the purpose of a better overview without upper stand element 43. The membrane 42 bearing the machine housing 3 is fastened on the upper side of the bottom bases 41B, and in this case completely spans over the lower stand element 41. Here and in the following, the term "to span over" basically comprises in this case the complete or partial over-spanning, wherein in this case, the over-spanning is configured such, that the projection of the center point M of the underside 31 is located along the rotational axis 21 of the rotor 2 within a supporting surface SF spanned by the separate bottom bases 41B by means of the membrane 4. The membrane 42, in this case, is spanned on all of the upper face surfaces of the four bottom bases 41B which form the bearing surfaces 411. By the arrangement of the bottom bases 41B, the basic base 31 is configured in such a way, that the membrane 42 establishes a self-supporting connection 42f between the machine housing 3 and the neighboring bottom bases 412 as the lower stand element 41. In this exemplary embodiment, the membrane 42 comprises a central opening 421 and a continuous surface 422 extending circumferentially around the opening and fastened onto the bottom bases 41B. The membrane 42 can advantageously have an annular shape adapted to the shape of the underside 31, such that the bottom bases 41B and machine bases 43M (not explicitly shown here for reasons of clarity) connected to the membrane 42 do not protrude beyond the underside 31 of the machine housing 3 in radial direction.

Figure 3:
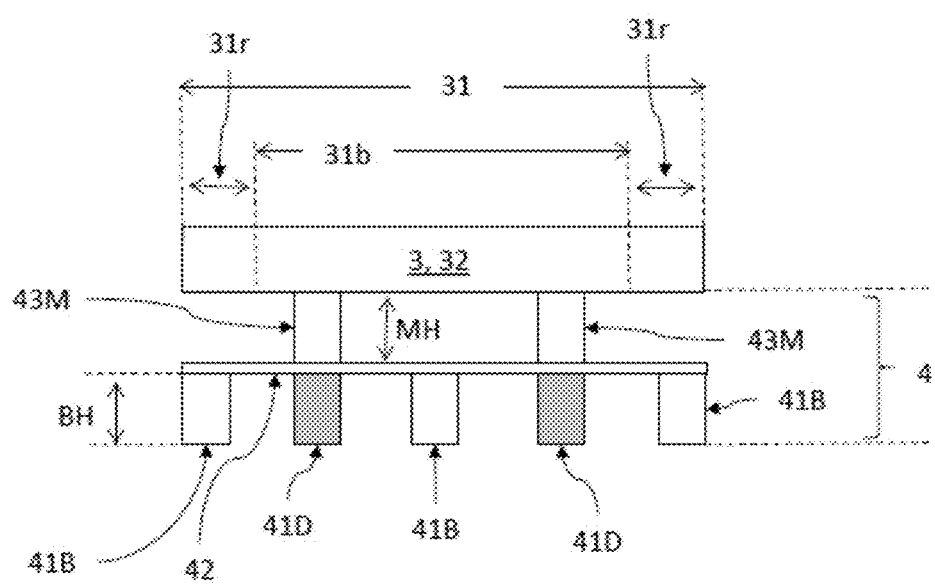
FIG. 3: shows another exemplary embodiment of a damping device according to the invention in the lateral sectional view.

FIG. 3 shows another exemplary embodiment of a damping device 4 according to the invention in a lateral sectional view. In this case, analogously to FIG. 2, four bottom bases 41B are arranged symmetrically to one another, wherein the one bottom base 41B (in the rear center) is obscured by the central bottom base 41B (center-front). Four machine bases 43M are likewise arranged on the membrane 42 fastened on the bottom bases 41B as the lower stand unit 41, which bases, in an arrangement rotated by 45° relative to the bottom bases 41B, are arranged on the membrane 42, wherein the two rear machine bases 43M are obscured by the two front machine bases 43M. On the machine bases 43M as the upper stand unit 43. In this exemplary embodiment, the lower stand unit 41 additionally comprises four damping elements 41D (illustrated in gray), which are each arranged on the machine base positions below the machine bases 43M, and which support the membrane 42 against the foundation (not shown here) in a resilient manner. Thereby, the same damping unit 4 can be used for different masses of the machine housing 3 and the rotor 2. For reasons of clarity, the machine housing 3 is merely indicated. In this case, the shape of the membrane 42 is adapted to the shape of the underside 31 in such a way, that the membrane, perpendicularly to the rotational axis, does not protrude beyond the underside 31. In this case, the underside 31 comprises a circumferential edge surface 31r and a bottom surface 31b located within the edge surface 31r, wherein the shape of the membrane 42, as a projection of the edge surface 31r, parallel to the axis of rotation 21 can have the same shape as the edge surface 31r. As far as the edge surface 31r is ring-shaped, the membrane 41 is accordingly of ring-shaped design as well.

Figure 4:
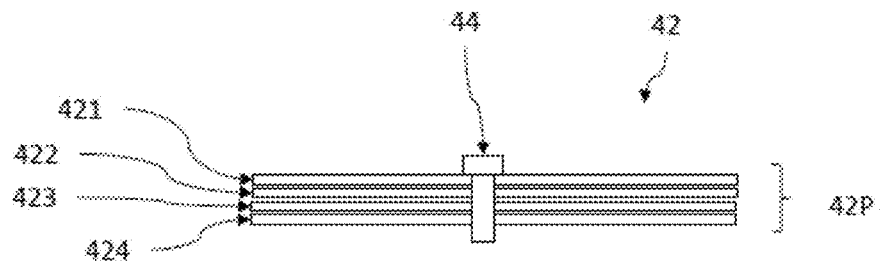
FIG. 4: shows an exemplary embodiment of a damping device according to the invention in the lateral sectional view.

FIG. 4 shows an exemplary embodiment of a membrane 42 according to the invention in the lateral sectional view. In this case, the membrane 42 consists of a membrane package 42P of four metal layers 421, 422, 423, 424 arranged one on top of the other, which, merely on the mounting points 44, are fixedly connected with each, and to the ground and or bottom bases 41, 412. In a falling of the rotor 2, metal layers 421, 422, 423, 424 deform and therefore rub against each other when receiving the released energy during the fall, which additionally absorbs the fall load and additionally dampens the movement of the machine housing 3. Here, the material layers 421, 422, 423, 424 can be configured alternately as supporting material layer 422, 424 (e.g. as a metal layer) and as damping material layer 421, 423 (e.g. from CFVK composite material or another material, for example plastic material).

Figure 5:
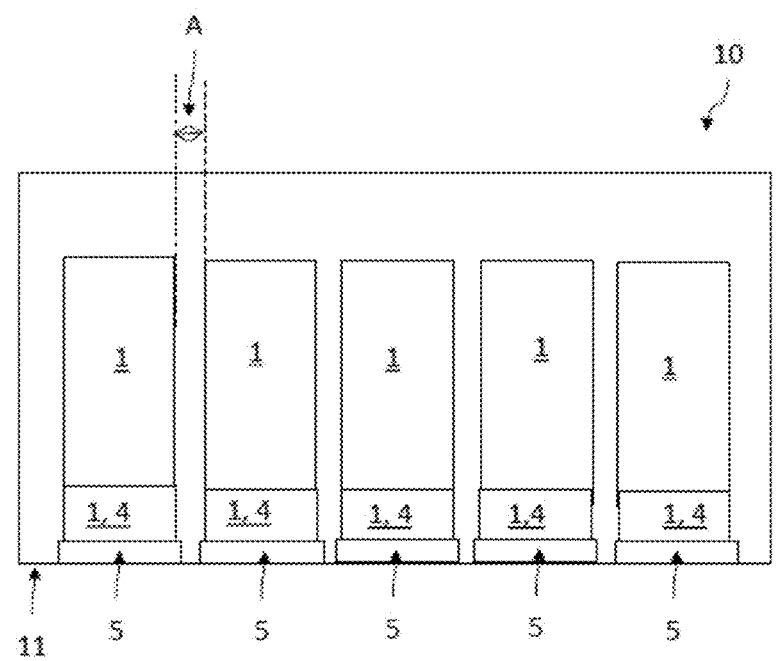
FIG. 5: shows an exemplary embodiment of a flywheel energy store according to the invention.

FIG. 5 shows an exemplary embodiment of a flywheel energy store 10 according to the invention, which comprises a plurality of flywheel units 1, arranged in rows of five flywheel units 1 in each case, wherein the flywheel units 1 are fixedly connected with the bottom 11 of the flywheel energy store 10 are respectively via a mounting plate 5 between the damping device 4 and the bottom 11. The distance A of neighboring flywheel units 1, perpendicular to the rotational axes 21 thereof in the flywheel energy store 10, can be selected to be smaller than or equal to 50 mm by using the damping device 4 according to the invention, whereby a particularly compact flywheel energy store 10, having a particularly high number of flywheel units 1 in a given volume of the flywheel energy store 10 is provided.

For example, twenty-eight flywheel units 1 can be arranged inside the flywheel energy store 10, which are connected via an electric intermediate circuit for providing a common storage capacity and output. The number of flywheel units 1 is adapted to the fact that the flywheel energy store 10, via the thusly provided total capacity and output, can feed power into a connected power grid 5 over a time period of more than 30 seconds. Here, the individual flywheel units 1 can transfer 20 kW of power, on average. This flywheel energy store 10 therefore has a total capacity of 560 kW. The number of flywheel units 1 in a flywheel energy store 10 can vary depending on the respective flywheel energy store.

The exemplary embodiments shown herein only constitute examples for the present invention, and therefore are not to be construed as limiting. Alternative embodiments considered by the person skilled in the art are likewise included within the scope of the present invention.

LIST OF REFERENCE CHARACTERS

1 flywheel units
2 rotor
21 rotational axis of rotor
3 machine housing
31 underside of the machine housing
31r edge surface of the underside
31b bottom surface of the underside
32 flange
33 upper side of machine housing
4 damping device
41 lower stand unit
41B bottom base
41D damping element (in the lower stand unit)
42 membrane
421 central opening in the membrane
422 continuous surface extending circumferentially around the opening
42f self-supporting connection
42P membrane package
421-424 material layers in the membrane package
43 upper stand unit
43M machine base
44 mounting points
5 mounting plate
10 flywheel energy store 11 foundation (bottom) of the flywheel energy store
A Distance of neighboring flywheel units in the flywheel energy store
BH Height of bottom base (of the bottom bases)
D Distance of the machine base position to neighboring bottom bases
M Center point of underside
MH Height of machine base (of the machine bases)
SF Supporting surface

The invention claimed is:

1. A flywheel unit for a flywheel energy store comprising a rotor, a machine housing enclosing the rotor with an underside, and a damping device fastened to the underside of the machine housing for fastening the flywheel unit on a suitable foundation, wherein the damping device comprises a lower stand unit for fastening on the foundation, an upper stand unit for fastening to the underside of the machine housing, and a membrane, which connects the lower stand unit to the upper stand unit, wherein the upper and lower stand units, as well as the membrane, are configured in such a way that the membrane can establish a self-supporting pliable connection between the upper and the lower stand units.

2. The flywheel unit according to claim 1, characterized in that
the lower stand unit comprises at least three bottom bases separated relative to one another with a first bottom base height, on which the membrane is clamped, wherein the bottom bases are arranged relative to one another in such a way that the projection of the center point of the underside is located along the rotational axis of the rotor within a supporting surface spanned by the separate bottom bases.

3. The flywheel unit according to claim 2, characterized in that
the separate bottom bases of the lower stand unit are arranged symmetrically to one another in a plane parallel to the base area around the rotational axis of the rotor.

4. The flywheel unit according to claim 2, characterized in that
the upper stand unit comprises a number of machine bases with a machine base height, the number of machine bases being connected to the membrane between the membrane and the base area of the machine housing on the self-supporting regions of the membrane at respective machine base positions.

5. The flywheel unit according to claim 4, characterized in that
the machine base positions are each located in the membrane segment spanned between two neighboring bottom bases and the rotational axis of the rotor.

6. The flywheel unit according to claim 5, characterized in that
the number of machine bases is equal to the number of bottom bases, and the machine base positions in the membrane plane each have the same distance to the respective neighboring bottom bases.

7. The flywheel unit according to claim 1, characterized in that
the lower stand unit additionally comprises one or multiple damping elements, the one or multiple damping elements being arranged below a respective machine base position and support the membrane with respect to the foundation in a resilient manner.

8. The flywheel unit according to claim 1, characterized in that
the membrane comprises a central opening, and a continuous surface extending circumferentially around the opening and fastened on the lower stand unit.

9. The flywheel unit according to claim 1, characterized in that
the shape of the membrane is adapted to the shape of the underside in such a way, that the membrane does not project laterally beyond the underside, perpendicular to the rotational axis.

10. The flywheel unit according to claim 9, characterized in that
the underside comprises a circumferential edge surface and a bottom surface located within said edge surface, wherein the shape of the membrane as a projection of the edge surface parallel to the rotational axis has the same shape as the edge surface.

11. The flywheel unit according to claim 10, characterized in that
the edge surface is ring-shaped and that the membrane is accordingly ring-shaped.

12. The flywheel unit according to claim 1, characterized in that
the membrane comprises a membrane package of a plurality of material layers arranged one on top of the other.

13. The flywheel unit according to claim 12, characterized in that
the membrane package comprises at least partially alternatively arranged damping and supporting material layers.

14. A flywheel energy store comprises a plurality of flywheel units according to claim 1, wherein the flywheel units are fixedly connected to a foundation of the flywheel energy store.

15. Flywheel energy store according to claim 14, characterized in that
neighboring flywheel units have a distance perpendicular to the rotational axes thereof in the flywheel energy store, wherein the distance is less than or equal to 50 mm.

* * * * *